United States Patent
Chen

(10) Patent No.: US 7,517,448 B2
(45) Date of Patent: Apr. 14, 2009

(54) RECYCLING COOL WATER FILTER

(76) Inventor: Tony C. T. Chen, 235 Chung-Ho Box 8-24, Taipei (TW)

( * ) Notice: Subject to any disclaimer, the term of this patent is extended or adjusted under 35 U.S.C. 154(b) by 677 days.

(21) Appl. No.: 11/191,202

(22) Filed: Jul. 28, 2005

(65) Prior Publication Data

US 2007/0023335 A1 Feb. 1, 2007

(51) Int. Cl.
*C02F 9/12* (2006.01)

(52) U.S. Cl. ............... 210/96.1; 204/665; 204/666; 210/134; 210/143; 210/167.29; 210/167.31; 210/195.1; 210/202; 210/203; 210/223; 210/243; 210/259; 210/497.01; 422/186.08; 422/186.1; 422/186.14

(58) Field of Classification Search ............ 210/85, 210/96.1, 143, 167.01–167.32, 192, 195.1, 210/201–203, 223, 258, 259, 748, 760, 805, 210/205, 243, 295, 752, 134, 497.01; 204/665, 204/666; 422/186.08, 186.1, 186.14
See application file for complete search history.

(56) References Cited

U.S. PATENT DOCUMENTS

| | | | |
|---|---|---|---|
| 4,389,253 A | * | 6/1983 | Nishimura et al. ............ 134/1 |
| 4,906,387 A | * | 3/1990 | Pisani ........................ 210/748 |
| 5,145,585 A | * | 9/1992 | Coke ......................... 210/695 |
| 5,294,916 A | * | 3/1994 | Bolton et al. ............... 340/606 |
| 5,660,723 A | * | 8/1997 | Sanderson .................. 210/90 |

* cited by examiner

*Primary Examiner*—Joseph W Drodge

(57) ABSTRACT

A cooling water recycling filter comprises a supersonic and electromagnetic wave limescale processor installed inside a main water recycling system of water storage tank and a sub water recycling system installed outside a main water recycling system. The sub water recycling system comprises a water quality control unit, a limescale processor unit, a limescale separation and filter unit and a high level oxidization and processing unit. An electric conductivity sensor, a PH value sensor, and an ORP oxidization and reduction potential meter of water quality control unit are used to measure the values of water quality. A limescale processor and impurities separator is used to filter impurities of the cooling water. After the cooling water is filtered precisely by the limescale separation and filter unit, the cooling water is sterilized by a copper and silver sterilizing and algae-killing unit of a sterilization unit.

1 Claim, 2 Drawing Sheets

RECYCLING COOL WATER FILTER

FIELD OF THE INVENTION

The present invention relates to filters, and in particular to a recycling cooling water filter for filtering out bacteria, bryophyte, limescale and impurities in the cooling water so as to assure having pure water for recycling and keeping air conditioners to have better efficiency in heat exchange, as well as preventing from getting disease caused by polluted air in the air conditioners.

BACKGROUND OF THE INVENTION

Generally, a prior art air conditioner uses a large scale refrigerating device to offer enough cool air for each floor of a building. The large scale of a refrigerating device is needed to use cool water so as to keep the temperature of the refrigerating device in lower temperatures with preferred heat exchange effect by use of the cooling water recycling in the refrigerating device and further prevent from tripping of the refrigerating device. However, cooling water of a prior art of an air conditioner is usually pumped from the refrigerating device and stays in a water storage tank for cooling down, and then is injected again into the refrigerating device so as to offer the recycling cooling water repeatedly. After the cooling water of the prior art is recycled in the refrigerating device, the cooling water stays in water storage tank for cooling down and flows immediately into the refrigerating device again without any filtering and sterilizing process. The wall of the water storage tank for cooling water is easy to be adhered by bacteria and algae after a period time using, which is easy to cause related diseases. For instance, Legionellosis is caused by polluted air environment. Bacteria is contained in the recycling cooling water of the prior art and algae is adhered to the wall of the water storage tank, which cause problems of a condenser having limescale and being corroded. Although the water storage tank may be cleaned, the cleaning process is simple by use that the cooling water is drained out and then refilled new cooling water. Otherwise, the water storage tank is cleaned only partially in visible areas. The other invisible areas in the inside of the water storage tank are not only difficult to be cleaned and usually ignored, but also easy to offer good breeding environment for bacteria. The water storage tank is difficult to be cleaned completely and is contained with bacteria, which is the weakness of the air conditioner of the prior art.

The problems caused by the cooling water, such as corrosion, limescale and bacteria in the water storage tank, has been encountered, when more and more new modern buildings, such as a hospital, an office, a restaurant and a department store, are constructed recently. However, the problems are unable to be solved by use of adding drug of the prior art. On the contrary, the prior art method of adding drug causes more serious environmental pollution problem.

SUMMARY OF THE INVENTION

Accordingly, the primary object of the present invention is to provide a cooling water recycling filter. Mainly, a supersonic and electromagnetic wave limescale processor is installed inside a main water recycling system of water storage tank. And a sub-water recycling system installed outside a main water recycling system comprises a water quality control unit, a limescale processor unit, a limescale separation and filter unit and high level oxidization and processing unit. The recycling cooling water filter is capable of magnetization and sterilization of the cooling water of water storage tank so as to assure the cooling water without any limescale and the water recycling of an air conditioner with good efficiency of heat exchange for energy saving.

The second object of the present invention is to provide a recycling cooling water filter, wherein the cooling water of the water storage tank is processed to monitor, filter, remove impurities, sterilize and kill algae by use of limescale separation and filter unit, limescale processor unit, sterilization unit and high level oxidization and processing unit. The cooling water is free from chemical pollution and prevents from becoming pollution source of environment, as well as related diseases, such as Legionellosis.

The third object of the present invention is to provide a recycling cooling water filter, wherein the water storage tank is kept clean without bad odor and foam in the tank, and the cooling water is able to keep given PH value, temperature and chemical property thereof by use of multiple physical processing system so as to increase the recycling utilization of the cooling water.

The forth object of the present invention is to provide a recycling cooling water filter, wherein the filter is able to be applied not only in the water storage tank of a building, but also in swimming pool, gymnasium and sauna. The water storage tank of a swimming pool, a gymnasium and sauna is able to use the filter to clean, sterilize and filter so as to assure clean water thereof, as well as reach the goal of water recycling.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
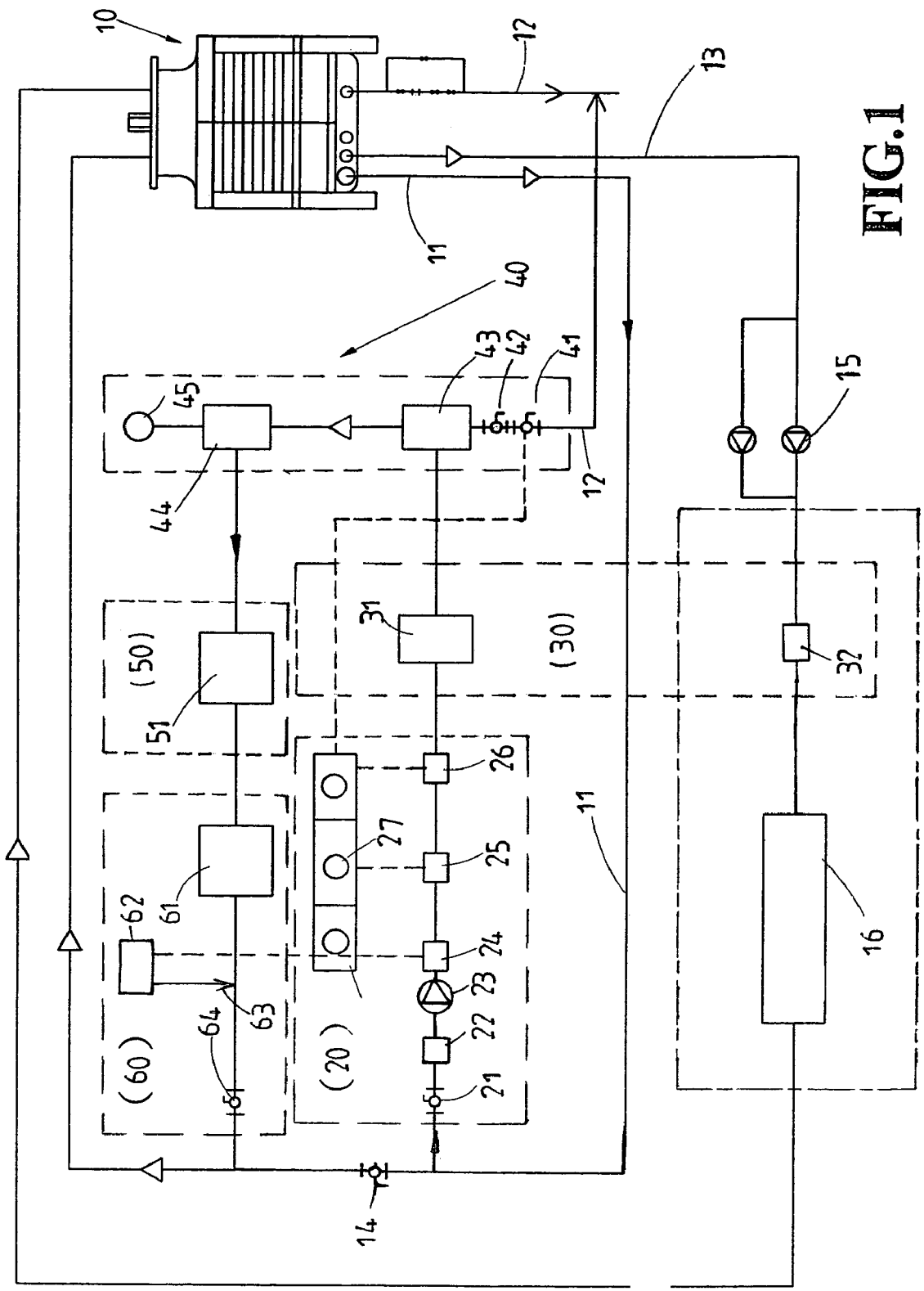
FIG. 1 illustrates a flow chart of the cooling water recycling filter of the prevention.

Referring to FIG. 1, a water quality control unit 20 is a water tube 11 of a water storage tank 10. A pump 23 serves to pump cooling water in the water storage tank 10. A filter net 22 serves to roughly filter cooling water flow therethrough. An ORP (oxidization and reduction potential) meter 24 serves to measure the oxidization and reduction potential difference. A PH value sensor 25 serves to measure the PH value. An electric conductivity sensor 26 serves to measure conductivity. A water quality monitor 27 serves to the variations of the measuring data. The pumped cooling water flows through the filter net 22, ORP oxidization and reduction potential meter 24, PH value sensor 25, and electric conductivity sensor 26 from the isolation valve 21. The water quality monitor 27 serves to monitor the water quality of the ORP oxidization and reduction potential meter 24, PH value sensor 25, and electric conductivity sensor 26.

A limescale separation and filter unit 30 is connected to the water quality control unit 20. The limescale separation and filter unit 40 has magnetization function for changing the configuration of the limescale so that the limescales will not adhere to a tube wall and thus they can be drained out. A supersonic and electromagnetic wave limescale processor 32 is used with the limescale separation and filter unit 40 for removing the limescale completely.

Figure 2:
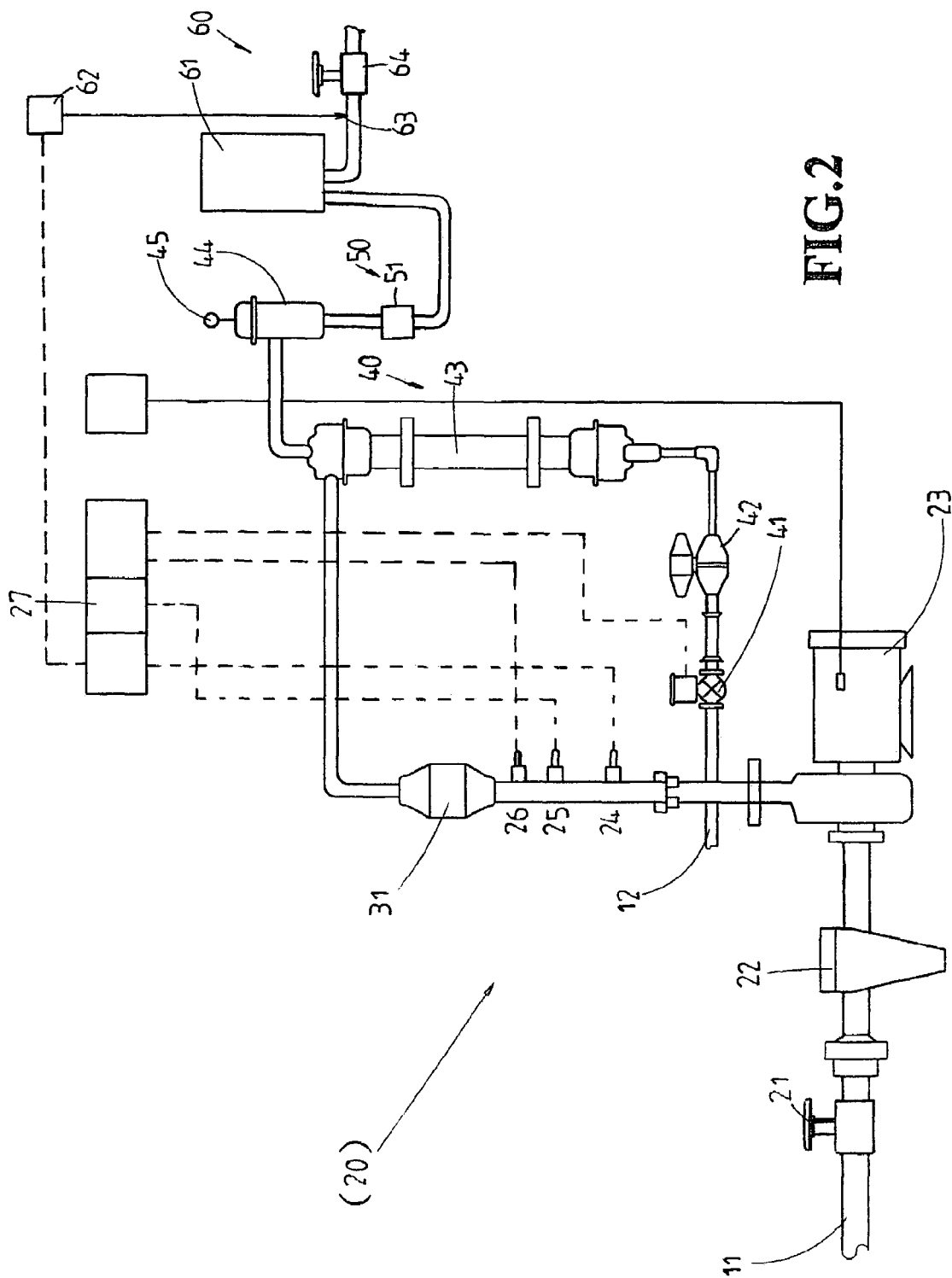
FIG. 2 illustrates a device composition of the cooling water recycling filter of the prevention.

An impurities separation and filer unit 40 is formed mainly by an impurities separator 43 and a bag shape filter cylinder 44. The impurities separator 43 is controlled by the electric conductivity sensor 26 of the water quality control unit 20. A drain section 12 at a bottom of the impurities separator 43 is installed with an electromotive valve 41 and a manual isolation valve 42, as shown in FIG. 2. The electromotive valve 41 is connected to the water quality monitor 27 of the water quality control unit 20. By the action of the water quality monitor 27 and the electromotive valve 41, the dirty water is drained out from the drain tube 12. The bag shape filter cylinder 44 is connected to the impurities separator 43 for completely filtering the cooling water. A pressure meter 45 can be installed on the bag shape filter cylinder 44.

A sterilization unit 50 is a copper and silver sterilizing and algae-killing unit 51. The sterilization unit 50 is installed at a water outlet for sterilization and killing algae.

A high level oxidization and processing unit 60 is formed with a light oxidization tank 61, an ozone ($H_2O_2$) adding unit 62. The light oxidization tank 61 is connected after the copper and silver sterilizing and algae-killing unit 51 and the ozone ($H_2O_2$) adding unit 62 is connected after the light oxidization tank 61. The ozone ($H_2O_2$) adding unit 62 is controlled by the ORP oxidization and reduction potential meter 24 or the PH value sensor 25. The ozone ($H_2O_2$) adding unit 62 is connected with an ozone injection head 63. An isolation net 63 is installed to the water tube and then is connect to the water storage tank 10. Finally, a filter for the recycling cooling water is completed.

In operation, the cooling water in the water storage tank 10 is pumped by the pump 23 and passing through the water tube 11 to water quality control unit 20. The cooling water flows into the isolation valve 21 through the filter net 22 so as to filter bigger suspended solids. The filtered cooling water flows into the ORP oxidization and reduction potential meter 24 to measure the oxidization and reduction potential difference of the water. Then the PH value of the water is measured by the PH value sensor 25 and the electric conductivity value is measured by the electric conductivity sensor 26. The data of water quality, which are measured by the ORP oxidization and reduction potential meter 24, PH value sensor 25 and electric conductivity sensor 26, are presented by the water quality monitor 27 of the water quality control unit 20 so that a user is able to assure the values of the oxidization and reduction potential, the electric conductivity and PH of the cooling water. Furthermore, the magnetization acted by the limescale processor 31 of the limescale processor unit 30 and supersonic and electromagnetic wave limescale processor 32 installed in the main recycling system is capable of changing limescale type thereof so that the limescale is easy to be drained out and is difficult to adhere on the wall. After the cooling water is filtered by impurities separator 43, the impure water is drained out from the recycling system by the drain section 12 by turning on the electromotive valve 41. Then the cleaning cooling water is further filtered precisely by the bag shape filter cylinder 44 and flows into the copper and silver sterilizing and algae-killing unit 51 of the sterilization unit 50 for the first process of sterilization and algae-killing so as to reach the goal that the cleaning cooling water is pure without bacteria, germs and algae. After the second process of sterilization and algae-killing by ultraviolet rays and ozone of light oxidization tank 61, the pure cooling water flows back to the water storage tank 10 and the water recycling is completed once. Alternatively, the cooling water flows through the light oxidization tank 61 and use $H_2O_2$, which is injected into the ozone ($H_2O_2$) adding unit 62 for processing high level oxidization and reduction at the first process of sterilization and algae-killing. Finally, the cooling water is pumped by the pump 15 of the main recycling system to flow back to the water storage tank 10. Then the cooling water passes through a main water recycling outlet 13 and flows into the condenser 16 for cooling the water, after removing the limescales by the supersonic and electromagnetic wave limescale processor 32. The process of cooling water recycling and heat exchange is completed once, when the cooling water flows back to the water storage tank 10 to assure that the cooling water has no limescale and the water recycling of an air conditioner has preferred efficiency of heat exchange.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A recycling cooling water filter comprising:
   a supersonic and electromagnetic wave limescale processor installed inside a main water recycling system of a water storage tank;
   a sub water recycling system installed outside the main water recycling system; the sub water recycling system comprising a water quality control unit, a limescale processor unit, a limescale separation and filter unit and a high level oxidization and processing unit;
   wherein cooling water in the sub water recycling system is monitored by the water quality control unit, then passes through the limescale processor unit; after the cooling water is filtered by the limescale separation and filter unit, impure water is drained out from the sub water recycling system; then a sterilization unit performs a sterilization and algae-killing process for the cooling water; the high level oxidization and processing unit processes high level oxidization and reduction at a second process of sterilization and algae-killing; pure cooling water is pumped to the water storage tank; and
   wherein limescale in cooling water of the main water recycling system is filtered by the supersonic and electromagnetic wave limescale processor; and thus the cooling water is pure without limescale and flows into a condenser; and
   where the water quality control unit further comprises:
   a pump for pumping cooling water in the water storage tank;
   a filter net for roughly filtering cooling water flow therethrough;
   an ORP oxidization and reduction potential meter for measuring oxidization and reduction potential difference;
   a PH value sensor for measuring PH value;
   an electric conductivity sensor for measuring conductivity; and
   a water quality monitor for monitoring variations of measuring data;
   wherein the cooling water flows through the filter net, the ORP oxidization and reduction potential meter, the PH value sensor, and the electric conductivity sensor from the isolation valve; the water quality monitor serves to monitor water quality of the ORP oxidization and reduction potential meter, the PH value sensor, and the electric conductivity sensor, wherein the limescale separation and filter unit is connected to the water quality control unit; the limescale separation and filter unit has magnetization function so that the limescales will not adhere to a tube wall and thus they can be drained out; a supersonic and electromagnetic wave limescale processor is used with the limescale separation and filter unit for removing the limescale completely; and wherein the impurities separation and filter unit is formed by an impurities separator and a bag shape filter cylinder; the impurities separator is controlled by the electric conductivity sensor of the water quality control unit; a drain section at a bottom of the impurities separator is installed with an electromotive valve; the electromotive valve is connected to the water quality monitor of the water quality control unit; by an action of the water quality monitor and the electromotive valve, dirty water is drained out from the drain tube; the sterilization unit is a copper and silver sterilizing and algae-killing unit; the sterilization unit is installed at a water outlet for sterilization and killing algae;

the high level oxidization and processing unit being formed by a light oxidization tank and an ozone ($H_2O_2$) adding unit; the ozone ($H_2O_2$) adding unit being controlled by an ORP oxidization and reduction potential meter or a PH value sensor; the ozone ($H_2O_2$) adding unit being connected with an ozone injection head; in case of impure cooling water, ozone being injected into cooling water through the ozone injection head for more precise sterilization and killing algae; pure cooling water flows back to water storage tank through isolation valve to assure the cooling water without impurities.

* * * * *